(12) United States Patent
Subramanian et al.

(10) Patent No.: US 10,764,152 B1
(45) Date of Patent: *Sep. 1, 2020

(54) METHODS AND APPARATUS FOR CENTRALIZED CONFIGURATION MANAGEMENT OF HETEROGENOUS NETWORK DEVICES THROUGH SOFTWARE-BASED NODE UNIFICATION

(71) Applicant: Juniper Networks, Inc., Sunnyvale, CA (US)

(72) Inventors: Srikanth Subramanian, Fremont, CA (US); Raymond Wing Cheh, Sunnyvale, CA (US); Jaganathan S. Murugesan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,422

(22) Filed: Apr. 11, 2019

Related U.S. Application Data

(63) Continuation of application No. 15/224,061, filed on Jul. 29, 2016, now Pat. No. 10,305,750.

(51) Int. Cl.
*H04L 12/24* (2006.01)
*G06F 16/21* (2019.01)

(52) U.S. Cl.
CPC ............ *H04L 41/20* (2013.01); *G06F 16/213* (2019.01); *H04L 41/0859* (2013.01); *H04L 41/22* (2013.01)

(58) Field of Classification Search
CPC ............ H04L 41/0806; H04L 41/0893; H04L 41/0803; H04L 41/082; H04L 41/0869; H04L 41/0873; H04L 41/0853; H04L 41/0856; H04L 41/085; H04L 41/0866; H04L 41/0889; H04L 41/20; Y10S 707/99931; Y10S 707/99942; Y10S 707/99943
See application file for complete search history.

(56) References Cited

U.S. PATENT DOCUMENTS

| | | | |
|---|---|---|---|
| 7,103,874 B2 * | 9/2006 | McCollum | G06F 8/36 709/220 |
| 7,237,243 B2 * | 6/2007 | Sutton | H04L 41/024 719/310 |

(Continued)

*Primary Examiner* — Sargon N Nano
(74) *Attorney, Agent, or Firm* — Cooley LLP

(57) ABSTRACT

Apparatus and methods described herein relate to an apparatus including a memory and a processor operatively coupled to the memory. The processor can receive a package associated with a network management device and management input. The processor can generate at least one management device schema based on the package, and can modify a controller schema based on the management input and the at least one management device schema. The processor can receive a configuration input signal that includes instructions to configure the network management device. The processor can determine a management device schema associated with the network management device based on the controller schema, and can convert the configuration input signal into a configuration signal based on the management device schema. The processor can also send the configuration signal to cause a modification to a configuration of the network management device based on the configuration signal.

20 Claims, 9 Drawing Sheets

(56) References Cited

U.S. PATENT DOCUMENTS

| | | | |
|---|---|---|---|
| 7,484,104 B2 * | 1/2009 | Masui | G06F 21/12 |
| | | | 713/189 |
| 7,515,560 B2 * | 4/2009 | DuMas | H04L 45/00 |
| | | | 370/260 |
| 7,856,659 B2 * | 12/2010 | Keeler | G06Q 20/206 |
| | | | 726/12 |
| 8,131,831 B1 * | 3/2012 | Hu | H04M 15/43 |
| | | | 379/201.03 |
| 8,266,180 B2 * | 9/2012 | Zazrivec | G06F 16/213 |
| | | | 707/791 |
| 8,291,115 B2 * | 10/2012 | Bitterlich | H04L 45/24 |
| | | | 709/216 |
| 8,789,140 B2 * | 7/2014 | Williams | H04L 41/0853 |
| | | | 726/3 |
| 8,812,828 B2 * | 8/2014 | Datta | G06F 21/575 |
| | | | 713/2 |
| 9,253,643 B2 | 2/2016 | Pattar et al. | |
| 9,450,805 B2 * | 9/2016 | Cvijetic | H04L 45/38 |
| 9,665,364 B2 * | 5/2017 | Jia | G06F 8/654 |
| 2003/0037177 A1 | 2/2003 | Sutton et al. | |
| 2005/0065977 A1 | 3/2005 | Benson et al. | |
| 2007/0255936 A1 | 11/2007 | Stemen | |
| 2011/0173302 A1 * | 7/2011 | Rider | G06F 9/44505 |
| | | | 709/220 |
| 2011/0295876 A1 | 12/2011 | Zazrivec et al. | |
| 2012/0047244 A1 * | 2/2012 | Shi | H04L 41/044 |
| | | | 709/223 |
| 2014/0122541 A1 | 5/2014 | Kang et al. | |
| 2014/0280268 A1 | 9/2014 | McKay | |
| 2015/0074281 A1 * | 3/2015 | Vendrow | G06F 8/60 |
| | | | 709/226 |
| 2015/0074639 A1 * | 3/2015 | Sanghvi | H04L 41/046 |
| | | | 717/120 |
| 2015/0213043 A1 | 7/2015 | Ishii et al. | |
| 2015/0304209 A1 * | 10/2015 | Choudhury | H04L 45/26 |
| | | | 370/255 |
| 2017/0338665 A1 | 11/2017 | Long et al. | |

\* cited by examiner

METHODS AND APPARATUS FOR CENTRALIZED CONFIGURATION MANAGEMENT OF HETEROGENOUS NETWORK DEVICES THROUGH SOFTWARE-BASED NODE UNIFICATION

CROSS-REFERENCE TO RELATED APPLICATION

This application is a continuation of U.S. patent application Ser. No. 15/244,061, now U.S. Pat. No. 10,305,750, filed on Jul. 29, 2016, and entitled "Methods and Apparatus for Centralized Configuration Management of Heterogenous Network Devices Through Software-Based Node Unification", the disclosure of which is incorporated herein by reference in its entirety.

FIELD

The methods and apparatus described herein are generally related, for example, to a centralized configuration management of diverse network platforms, through software node unification.

BACKGROUND

In some known network systems, a network controller can control a number of network devices. For example, a network controller can be configured to send configuration signals to other network devices in a network. In some known network systems, however, each network device can be running one of many possible software configurations. Thus, in some known network systems, when a network administrator provides configuration instructions to the network controller, a network administrator can be required to provide different configuration commands for each network device the network administrator is configuring. Additionally, in some known network systems, a network administrator is required to access each network device directly, to configure multiple network devices (particularly if each of the network devices has different software installed on those network devices, and/or if some of the network devices have been assembled by different manufacturers). Even if a copy of a network device configuration schema were provided to the network controller, in some known network systems, the network device configuration schema may be formatted such that the network controller, having a different hardware and/or software priority communication format than the network device, would be unable to interpret, much less perform any actions using, the network device configuration schema.

Accordingly, a need exists for methods and apparatus that can allow a network controller to provide a unified interface and/or mechanism for providing configuration instructions to a network administrator.

SUMMARY

In one implementation, an apparatus including a memory and a processor operatively coupled to the memory. The processor can receive a network management device package associated with a network management device, and management input. The processor can generate at least one management device schema, based on the network management device package, and can modify a configuration database operatively coupled to the processor based on the management input and the at least one management device schema. The processor can receive a configuration input signal including instructions to configure the network management device, and can determine a management device schema associated with the network management device based on a controller schema and the configuration database. The processor can convert the configuration input signal into a management device schema configuration signal based on the management device schema, and can send the management device schema configuration signal, so as to cause a modification of a configuration of the network management device based on the management device schema configuration signal.

In another implementation, an apparatus can include a memory and a processor operatively coupled to the memory. The processor can generate a management device schema based on (1) network management device input received at the processor, and (2) a network management device package associated with a network management device. The processor can receive a network management device modification signal at a user interface, and can send a notification to the network management device of the network management device modification signal, using the modified controller schema. The processor can receive a request, from the network management device and in response to the notification, for network management device modifications included in the network management device modification signal, and can send a signal to the network management device that includes the network management device modifications. The processor can then receive a confirmation from the network management device indicating that the network management device has accepted the network management device modifications, and can instruct the network management device to enact the network management device modifications.

In another implementation, a method can include receiving, from a network management device from network management devices in a network and/or a network administrator, a signal including a network management device package. The method can also include modifying a controller schema based on an association between the network management device package and a network management device from a set of network management devices. The method can also include generating a management device schema based on the network management device package. The method can also include receiving, via a user interface, configuration signal input, the configuration signal input including instructions to configure the network management device from network management devices. The method can also include retrieving the management device schema based on the controller schema and the configuration signal input, and generating a management device schema configuration command based on the configuration signal input and the management device schema. The method can include sending a signal including a representation of the management device schema configuration command. The method can also include receiving a confirmation from the network management device that the network management device has accepted a configuration modification defined in the management device schema configuration command, and instructing the network management device to enact the configuration modification.

DETAILED DESCRIPTION

In some implementations, a user operating a network administrator device can input and/or generate configuration commands for multiple network management devices, using the unified user interface, without separately accessing each network management device to configure that network management device. For example, the unified user interface allows for a network administrator to configure multiple network management devices of similar and/or different makes and/or models, in a parallel. A user operating the network administrator, for example, can enter configuration input into the unified user interface. The unified user interface can provide the input to a network controller having a management daemon, which can identify which network management devices to which to send configuration commands (based on the provided input). The management daemon can generate the configuration commands for each of the identified network management devices, and can provide the configuration commands to a node unifier daemon, so as to send the configuration commands to the identified network management devices. Thus, the unified user interface allows for the network controller to generate and send configuration commands to different network management devices, via a single, unified user interface.

In further implementations, network management device packages can allow a unified user interface to efficiently generate configuration commands for multiple heterogeneous network management devices. For example, network management device packages can serve as compressed and/or abbreviated versions of a network management device configuration schema (e.g., a schema that can be used to generate configuration commands that can instruct network management devices to modify their configuration settings).

When the network management device packages are stored as generated management device schemas, the network management device packages provide a method of generating management device schemas that a network controller can use to generate configuration commands. Specifically, by receiving the network management device packages, rather than a generated management device schema, the network controller can generate a management device schema that is agnostic to the underlying architecture of the network controller, such that the network controller can generate and send configuration commands to a network management device, even when the network controller has a different architectural configuration than the network management device.

Figure 1:
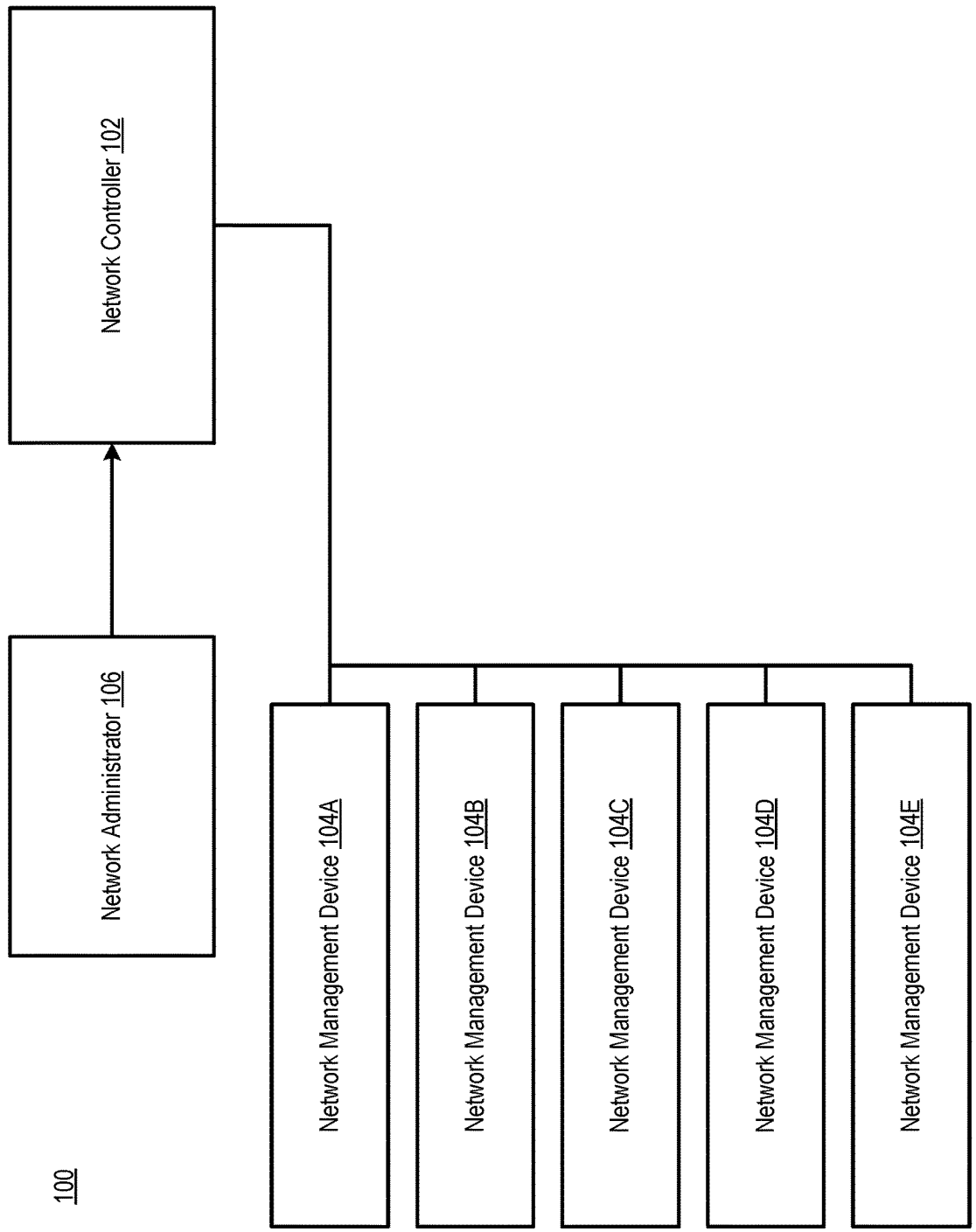
FIG. 1 is a schematic diagram illustrating a network controller, network management devices, and a network administrator, according to an embodiment.

FIG. 1 is a schematic diagram illustrating an example network 100. For example, in some implementations, a network 100 can include a network controller 102, a set of network management devices 104A-E, and a network administrator 106, in addition to other network devices (not shown) configured to facilitate various actions within the network 100. In some implementations, one or more of the network controller 102, at least a portion of the set of network management devices 104A-E, and/or the network administrator 106, can be located in a network different from the network 100. Thus, a portion of the network devices in the network 100 can interact with a portion of network devices in a network different from the network 100, such that the functionality of the network controller 102, the network management devices 104A-E, and/or the network administrator 106 can be distributed across one or more networks.

The network controller 102 can be operatively coupled to the network administrator 106 (e.g., via a wireless connection and/or a wired network connection), and each of the network management devices 104A-E (e.g., via a wireless connection and/or a wired network connection). As noted in FIGS. 2-5, for example, the network administrator 106 can send configuration information, configuration commands, and/or other information to the network controller 102, which can process the configuration information and/or commands prior to sending configuration instructions to network management devices 104A-E. In some implementations, the network administrator 106 can be part of a local network, and can be connected to the network controller 102 in the network via intervening network devices and/or sub-networks (e.g., the network administrator 106 can be connected to the network controller 102 via edge devices in the network 100, and/or via other network devices operatively coupled to the network controller 102). In other implementations, the network administrator 106 can be directly connected to the network controller 102. In some implementations, the network controller can be similarly connected to each of the network management devices 104A-E (e.g., can be connected to the network management devices 104A-E via intervening edge devices and/or other network devices, and/or intervening sub-networks, or can be directly connected to each of the network management devices 104A-E).

Figure 2:
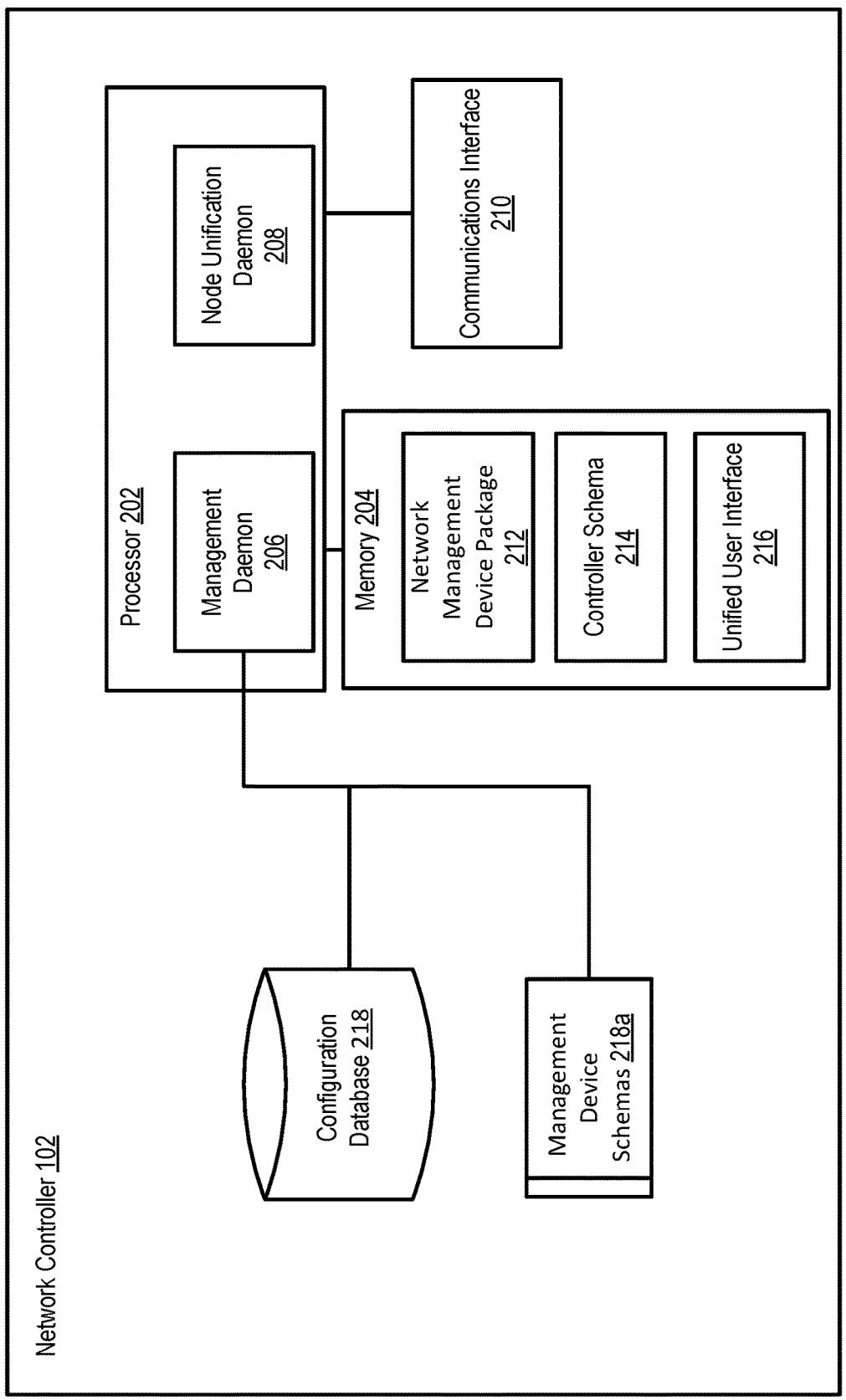
FIG. 2 is a schematic diagram illustrating a network controller, according to an embodiment.

In some implementations, the network administrator 106 can be a network device (e.g., a configuration application implemented on a network device), and/or a user operating a network device. A network administrator 106 device can include at least one processor, at least one memory, at least one communications interface, and/or at least one display interface configured to render at least one user interface (as shown in FIG. 2). The at least one processor can be any hardware module and/or component configured to receive and process data, and/or to execute code representing executable instructions. In some implementations, for example, the at least one processor can be a general purpose processor, a Field Programmable Gate Array (FPGA), an Application Specific Integrated Circuit (ASIC), a Digital Signal Processor (DSP), and/or the like. The at least one memory can be a hardware module and/or component configured to store data accessible by the at least one processor, and/or to store code representing executable instructions for the at least one processor. The memory can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory stores instructions to cause the at least one processor to execute modules, processes and/or functions associated with the network administrator 106.

Referring to FIG. 2, in some implementations, a network controller 102 can include at least one processor 202, at least one memory 204, at least one configuration database 218, and at least one communications interface 210. The at least one processor 202 and the at least one memory 204 can be similar to the at least one processor and at least one memory of the network administrator 106. The network controller 102 can be a controller configured to manage the configuration of various network management devices 104A-E in the network. For example, the network controller 102 can be a controller configured to receive configuration information from a network administrator 106, to process the configuration information, and to send the configuration information to relevant network management devices 104A-E. In some implementations, the network controller 102 can act as an interface and/or a master configuration device for all network management devices 102A-E in a network 100. In some implementations, the network controller 102 can also itself be a network device that can be configured by the network administrator 106, and can be configured by the network administrator 106 to manage the configuration of one or more of the network management devices 104A-E in the network 100.

The at least one processor 202 can include and/or implement a management daemon 206 and a node unification daemon 208. The management daemon 206 can be a background software process (executed by the at least one processor 202), and/or a specialized circuit included in and/or operatively coupled to the at least one processor 202 and configured to implement a background software process. The management daemon 206 can be configured to determine when configuration commands have been generated for any of the network management devices 104A-E, and to send a message to the node unifier daemon 208, indicating that a configuration command has been generated for a network management device 104 and/or a set of configuration commands has been generated for a set of network management devices 104A-E. The node unifier daemon 208 can then notify the network management devices 104A-E that a configuration command is pending for the network management device 104.

The at least one configuration database 218 can include at least one management device schema 218a generated by the network controller 102, e.g., from the network management device package 212. For example, in some implementations, the network controller 102 can receive a network management device package 212 including model and version identifiers, and/or other identifiers indicating a type of network management device 104 with which a network management device package 212 is associated. The network controller 102 (e.g., via the management daemon 206) can generate a management device schema 218a based on the network management device package 212, and can store a data file representing the management device schema 218a in the at least one configuration database 218. The network controller 102 can store multiple management device schemas 218a in a single configuration database 218, can maintain multiple configuration databases 218 for multiple types of network management devices 104A-E, and/or the like.

The controller schema 214 can be a binary data structure that includes mappings between each network management device 104 from the set of network management devices 104A-E, and multiple management device schemas 218a that are generated from network management device packages 212 sent to the network controller 102. In some implementations, the controller schema 214 and management device schemas 218a can be stored as type-length-value (TLV) packages 212 (i.e., the management device schemas 218a can be stored in their original network management device package 212 form); thus, the controller schema can include an association and/or mapping between each network management device 104 from the set of network management devices 104A-E, and each network management device package 212. Each TLV package 212 can indicate a command hierarchy of configuration commands, e.g., for generating and/or modifying a schema. In some implementations, TLV packages 212 for the management device schemas 218a can be provided for each different network management device model and/or version, and/or each network management device. In some implementations, TLV packages 212 for the management device schemas 218a can include information relating to configuration commands, lists of data fields and rules on values that can be associated with said data fields (e.g., data types of each data field, and/or the like), supported platforms, and/or similar information. In some implementations, the controller schema 214 can also be represented by and/or stored in a configuration database 218 of the network controller 102. The configuration database 218 can include a link between network management devices 104A-E and management device schemas stored by the network controller 102. The management daemon 206 can determine a management device schema for a particular network management device 104A, by querying the configuration database 218 for the appropriate management device schema.

The network management device packages 212 used to generate the management device schemas 218a can include information for generating configuration commands (e.g., can include names of data fields used to generate each configuration command, and/or the like). Each management device schema 218a can include configuration command syntax information, and/or similar information, that can be used to generate configuration commands for a particular network management device 104. In some implementations, management device schemas 218a may not be permanently stored at the network controller 102, and may instead be generated from network management device packages 212 and temporarily stored in at least one memory 204 when configuration commands are being generated (e.g., may be temporarily stored for the duration of generating the configuration commands).

In some implementations, to generate a configuration command, the management daemon 206 can receive input (e.g., from a network administrator 106) specifying a type of configuration modification, configuration modification values, and/or other information indicating the network administrator 106 would like to modify the configuration of a network management device. The management daemon 206 can use the controller schema 218a configuration database 218 on the network controller 102 to match a network management device 104 identified in input, to a management device schema 218a associated with the network management device 104, and/or to a network management device package 212 associated with the network management device 104. The matched management device schema 218a and/or network management device package 212 can then be used to generate a configuration command for that network management device 104, using the syntax, data field names, and/or other information included in the management device schema 218*a*, and the input provided to the management daemon 206. Further details regarding the controller schema 214, management device schemas 218*a*, and/or the like can be found at least in the discussion of FIGS. 4 and 6-9. In some implementations, managing a controller schema 214 can be optional (e.g., such as if a network management package 212 can be associated with each of the network management devices 104A-E). Said another way, the network controller 102 may not update and/or modify a controller schema 214 when there is not more than one network management device package 212 to associate with network management devices 104A-E within a network. The communications interface 210 can be configured to send and/or receive communications from other network devices, including the network administrator 106, and/or the network management devices 104A-E. In some implementations, the network controller 102 can communicate with network management devices 104A-E through Network Configuration Protocol (NETCONF) over secure shell (ssh) protocol.

Figure 3:
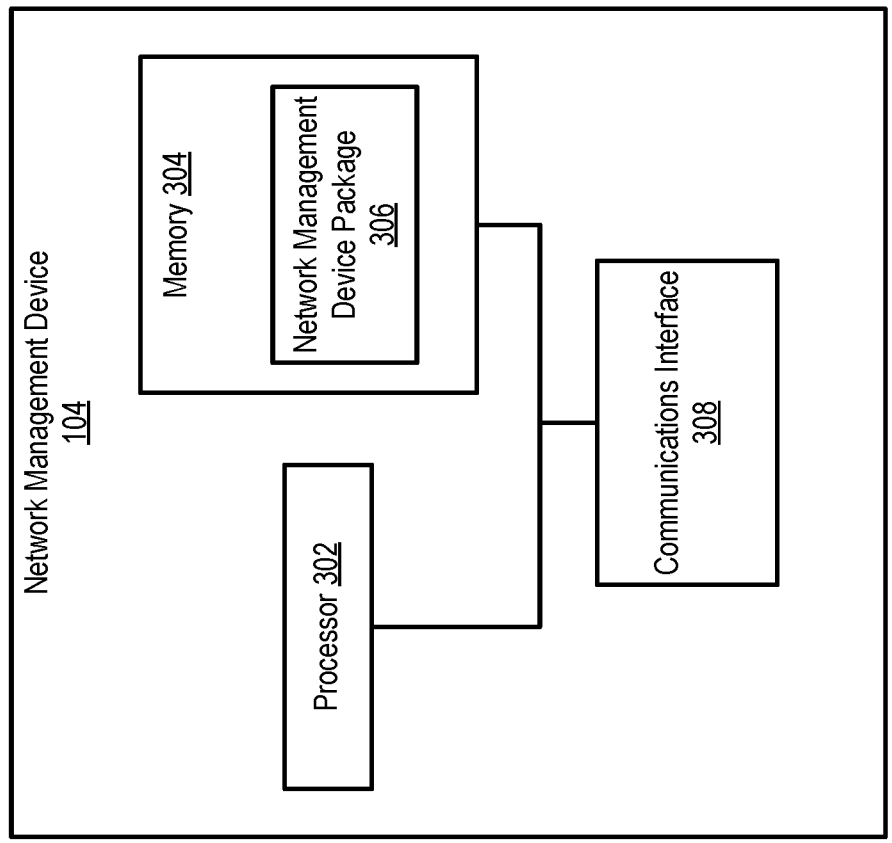
FIG. 3 is a schematic diagram illustrating a network management device, according to an embodiment.

Referring to FIG. 3, in some implementations, a network management device 104 can include at least one processor 302, at least one memory 304, and/or at least one communications interface 308. The at least one processor 302 and the at least one memory 304 can be similar to the at least one processor and at least one memory of the network controller 102. The network management device 104 can be a network device (e.g., including but not limited to a network switch, a network router, and/or the like) operating within a network. The network management device 104 can be configured to receive configuration commands from the network controller 102, e.g., via the node unification daemon 208. The at least one memory 304 can include a network management device package 306, i.e., a data structure including network management device configuration instructions and/or information (e.g., instructions based on the NETCONF protocol and/or the command-line interface (CLI) protocol) for the network management device 104. The network management device 104 can send the network management device package 306 to the network controller 102, so as to allow the network controller 102 to generate configuration commands for the network management device 104. Said another way, the network management device package 306 can be installed, by a network administrator 106, at the network controller 102, and/or can be retrieved from a network management device 104, by the network controller 102. The network controller 102 can then generate a management device schema 218*a* based on the network management device package 306. The network management device 104 can also receive these configuration commands from network controller 102 that the network management device 104 can implement and/or execute. Further information regarding the network management device packages 306 can be found, e.g., in the discussion of FIGS. 4 and 6-9. The communications interface 308 can be configured to send and/or receive communications from the network controller 102.

Returning to FIG. 2, the node unifier daemon 208 can be configured to receive and store configuration commands generated by the management daemon 206. The node unifier daemon 208 can also send messages to network management devices 104A-E indicating that the configuration commands are available for retrieval by the network management devices 104A-E. In some implementations, the node unifier daemon 208 can instruct the network management devices 104A-E to retrieve the configuration commands from the network controller 102, and can send the configuration commands to the network management devices 104A-E when the network management devices 104A-E request the configuration commands. Further details regarding the node unifier daemon 208 can be found, e.g., in the discussion of FIGS. 5, 7, and 9.

A unified user interface 216 can be an interface hosted by the network controller 102 and instantiated by the processor 202. The unified user interface 216 can allow a network administrator 106 to generate configuration commands for network management devices 104A-D, without having information on specific configuration command syntax for each network management device 104A-D. For example, a network administrator 106 can provide (and/or receive, from a user) input including a network management device model and/or type, and/or an identifier of a network management device 104, at the unified user interface 216. The network controller 102 can, via the management daemon 206, generate a management device schema 218*a* associated with the network management device model and/or with a specific network management device 104 (e.g., substantially in real time and in response to the input provided at the unified user interface 216), and can generate configuration commands based on the management device schema 218*a*.

Figure 4:
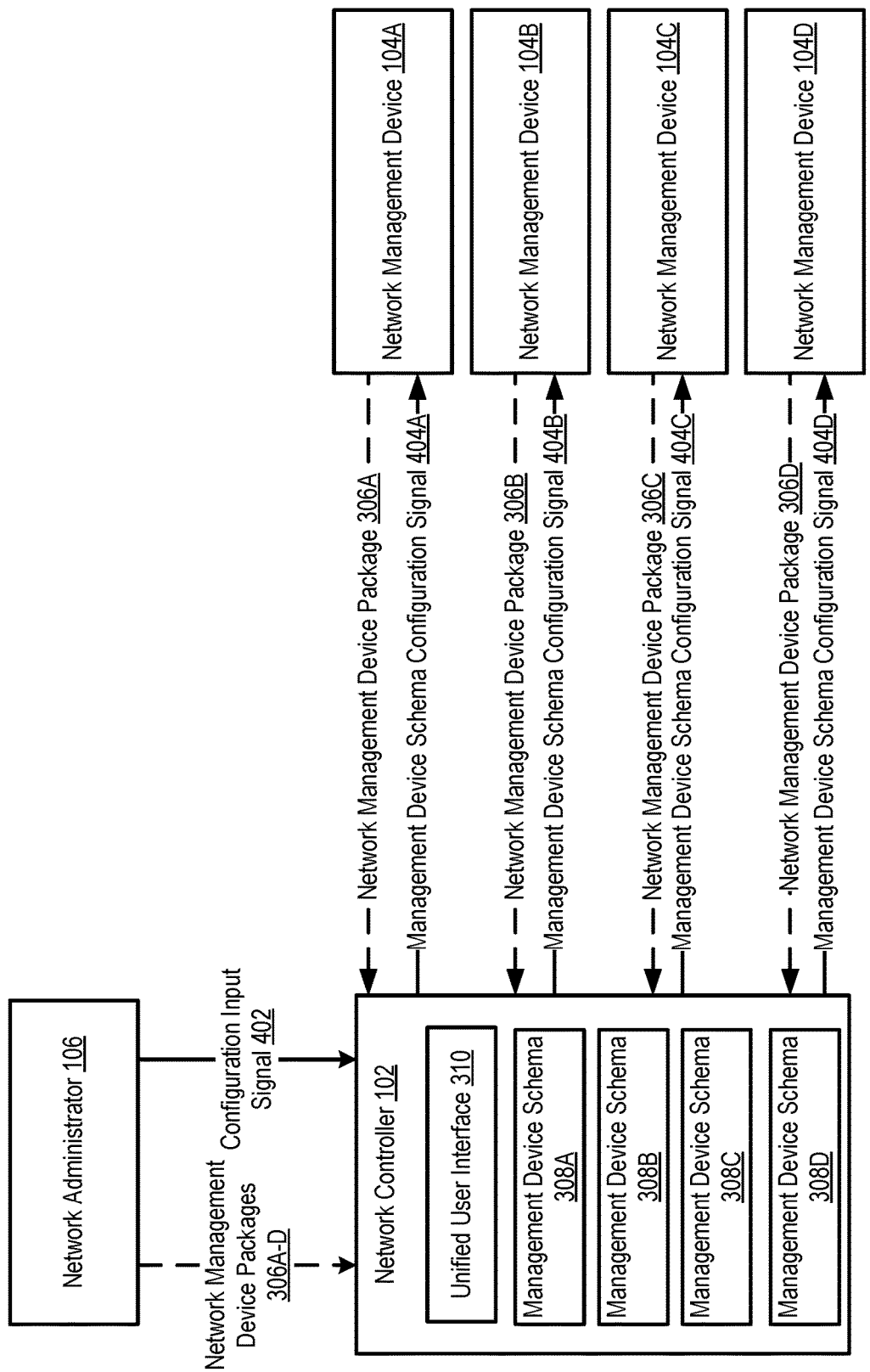
FIG. 4 is a schematic diagram illustrating transferring management device schemas, according to an embodiment.

FIG. 4 is a schematic diagram illustrating transferring network management device packages 306A-D. For example, in some implementations, each network management device package 306 includes a number of commands specific to the model and/or operating system of the network management device 104 associated with the network management device package 306. For example, network management device package 306A can specify commands specifically configured to be interpreted and implemented and/or executed by network management device 104A. As another example, network management device package 306B can specify commands configured to be interpreted and implemented and/or executed by network management device 104B. Configuration commands can include instructions for configuring network management devices 104A-E, including modifying settings of a network management device 104A, modifying connections between a network management device 104A and other network entities, and/or the like. Each network management device 104A-E can optionally send a network management device package 306 to the network controller 102 (e.g., upon boot up, upon being operatively coupled to the network controller 102, in response to a request for the network management device package 306 from the network controller 102, and/or the like). In other implementations, a network administrator 106 can also store copies of network management device packages 306A-D, and can send the copies to the network controller 102. The network controller 102 can extract commands from each of the network management device package 306A-D, so as to generate management device schemas 308A-D associated with the network management devices 104A-D, respectively. The network controller 102 can store associations between the network management devices 104A-D and the management device schemas 308A-D in a controller schema 214 (not shown in FIG. 4). For example, the network controller 102 can use the controller schema 214 to determine a management device schema 306A-D to use for generating configuration commands for a particular network management device 104A and/or a particular network management model type.

When a network administrator 106 is sending signals to configure and/or modify a network management device 104, the network administrator 106 can send a configuration input signal 402, the configuration input signal including configuration input for generating a configuration command, and an identifier of a network management device 104 and/or a network management device model type, to the network controller 102. The configuration input signal 402 can be sent to the network controller 102 and received at the communications interface 210. In other implementations, data for generating the configuration input signal 402 can be inputted into the unified user interface 216 by a user operating the network administrator 106, such that the unified user interface 216 can generate a configuration input signal 402 (e.g., such as an HTTP(S) POST signal) to be processed by the network controller 102. The network controller 102 can use the controller schema 214 to identify a management device schema 308 that is associated with the network management device 104 and/or network management device model identified in the configuration input signal 402. The management device schema 308 can then be used to generate a configuration command for the network management device 104.

For example, the network controller 102 can generate a management device schema configuration command based on the information in the configuration input signal 402, and based on the identified management device schema 308. Said another way, the network controller 102 can use commands specified within the identified management device schema 308 as a template that is used to generate a configuration command (e.g., based on the configuration input signal 402) that can be understood by a particular network management device 104. The network controller 102 can thus send the management device schema configuration command for the appropriate network management device 104, e.g., via a management device schema configuration signal 404. The network controller 102 can send such configuration signals 404 for any of the network management devices operatively coupled to the network controller 102.

Figure 5:
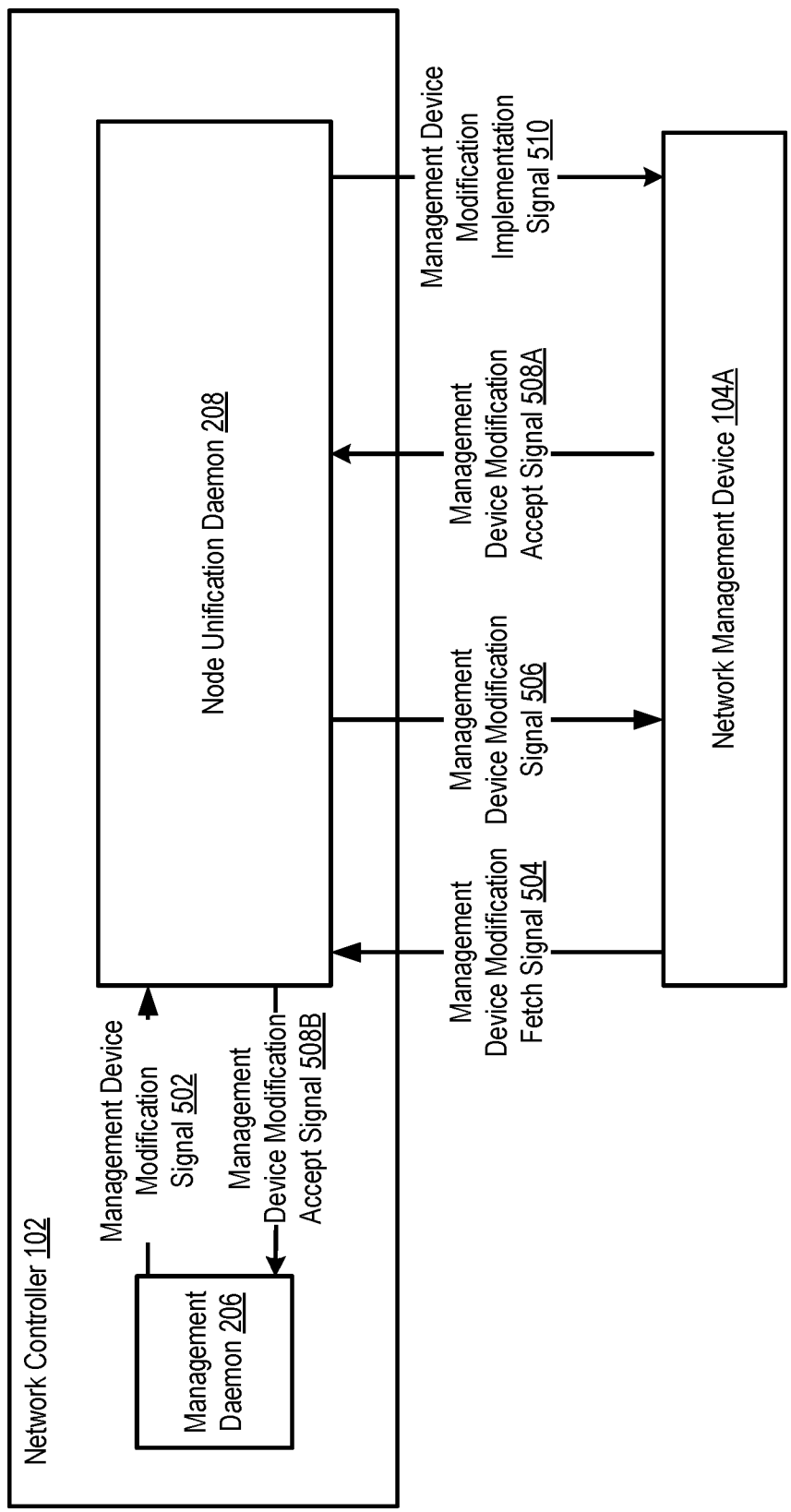
FIG. 5 is a schematic diagram illustrating modifying configuration settings of network management devices, according to an embodiment.

FIG. 5 is a schematic diagram illustrating modifying a network management device 104A. In some implementations, for example, a management daemon 206 of the network controller 102 can send a management device modification signal 502 (e.g., a management device schema configuration signal 404) to a node unifier daemon 208 of the network controller 102, when a user of network administrator 106 provides information for configuring a network management device 104A. In some implementations, the node unifier daemon 208 can send a notification signal to the network management device 104A, e.g., to notify the network management device 104A that a management device modification signal 502 and/or management device schema configuration signal 404A has been generated for that network management device 104A. The network management device 104A can send a management device modification fetch signal 504 to the node unifier daemon 208 to request a copy of the management device modification signal 502. The node unifier daemon 208 can send the copy of the management device modification signal 506 to the network management device 104A in response to the network management device 104A requesting the copy.

The network management device 104A can use its own copy of a management device schema 308A, and/or based on other information in the management device modification signal 506, to determine whether a management device schema configuration command in the management device modification signal 506 is executable by the network management device 104A. For example, the network management device 104A can compare the management device schema configuration command to the management device schema 308A at the network management device 104A, to determine whether the network management device 104A can implement the management device schema configuration command. If the network management device 104A can implement and/or execute the management device schema configuration command, the network management device 104A can send a management device modification accept signal 508A to the network controller 102 (e.g., to the node unification daemon 208), to confirm that the network management device 104A can implement and/or execute the instructions generated by the network controller 102. The node unification daemon 208 can save information in and/or associated with the management device modification accept signal 508A (e.g., can save the signal in a configuration log, can save a new configuration of the network management device 104A in a record associated with the network management device 104A, and/or the like). The node unification daemon 208 can also forward the accept signal to the management daemon 206 (e.g., management device modification accept signal 508B), such that the management daemon 206 can keep track of which configuration instructions the network management device 104A has accepted. The node unification daemon 208 can also send a management device modification implementation signal 510 to the network management device 104A, e.g., to instruct the network management device 104A to initiate the implementation and/or execution of the management device schema configuration command.

Figure 6:
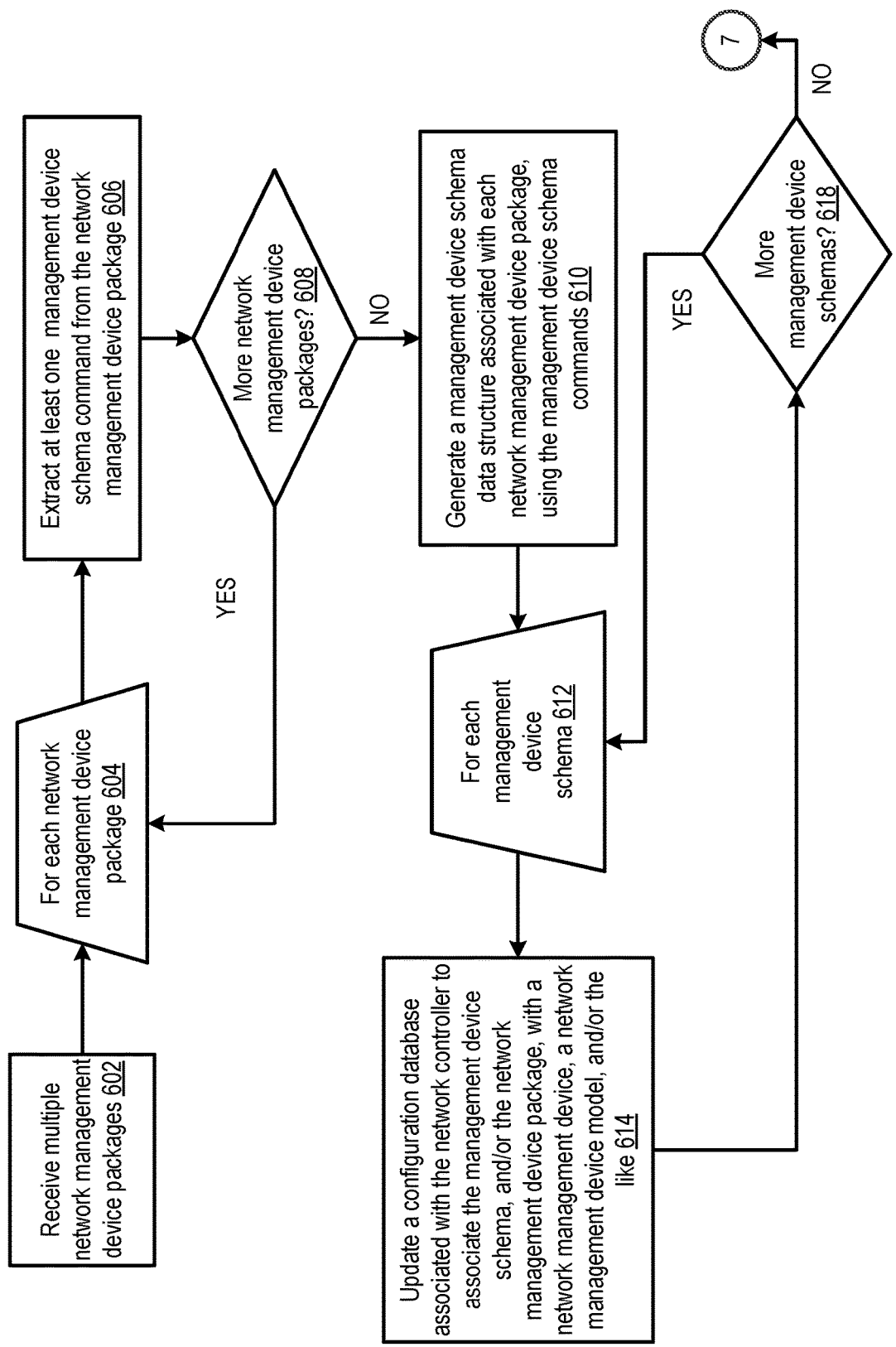
FIG. 6 is a logic flow diagram illustrating generating a controller schema, according to an embodiment.

FIG. 6 is a logic flow diagram illustrating generating a controller schema 214, according to an embodiment. In some implementation, a network controller 102 (and/or a similar network device) can, at 602, receive multiple network management device packages 306A-E, e.g., from multiple network management devices 104A-E, and/or from a network administrator 106 (e.g., as described in FIG. 4). For each network management device package 306A-E (e.g., at 604), the network controller 102 can, at 606, extract at least one management device schema configuration command from that network management device package 306A-E. Each management device schema configuration command can correspond to at least one instruction for modifying the configuration and/or settings of a network management device 104A-E. The network controller 102 can, at 608, determine whether there are more network management device packages 306 to process (e.g., from which to extract management device schema configuration commands), and can continue to process the remaining network management device packages 306 (e.g., repeat 604-608) until each of the received network management device packages 306A-E has been processed.

When each of the network management device package 306A-E has been processed, the network controller 102 can generate, at 610, a management device schema data structure 218a (e.g., a data structure for storing the management device schema configuration commands of that network management device package 306). The network controller 102 can store the management device schema data structure 218a in at least one configuration database 218 associated with the network controller 102. For each management device schema 218a (e.g., at 612), the network controller 102 can, at 614, update at least one configuration database 218 associated with the network controller 102, so as to associate the management device schema 218a, and/or the network management device package 306, with a particular network management device 104, a network management device make and/or model type, and/or the like. For example, the network controller 102 can determine (e.g., based on a source of the network management device packages 306, based on input from the network administrator 106, and/or the like) which network management device 104 is associated with a particular network management device package 306. The network controller 102, at 616, can then store the association in the configuration database 218. The network controller 102 can, at 618, determine whether there are more management device schemas 308 to process. If there are additional management device schemas 218*a* to process, the network controller 102 can continue to update the at least one configuration database 218 by associating the remaining management device schemas 218*a* with network management devices 104 (e.g., can continue 612-618 for each management device schema 218*a*).

Figure 7:
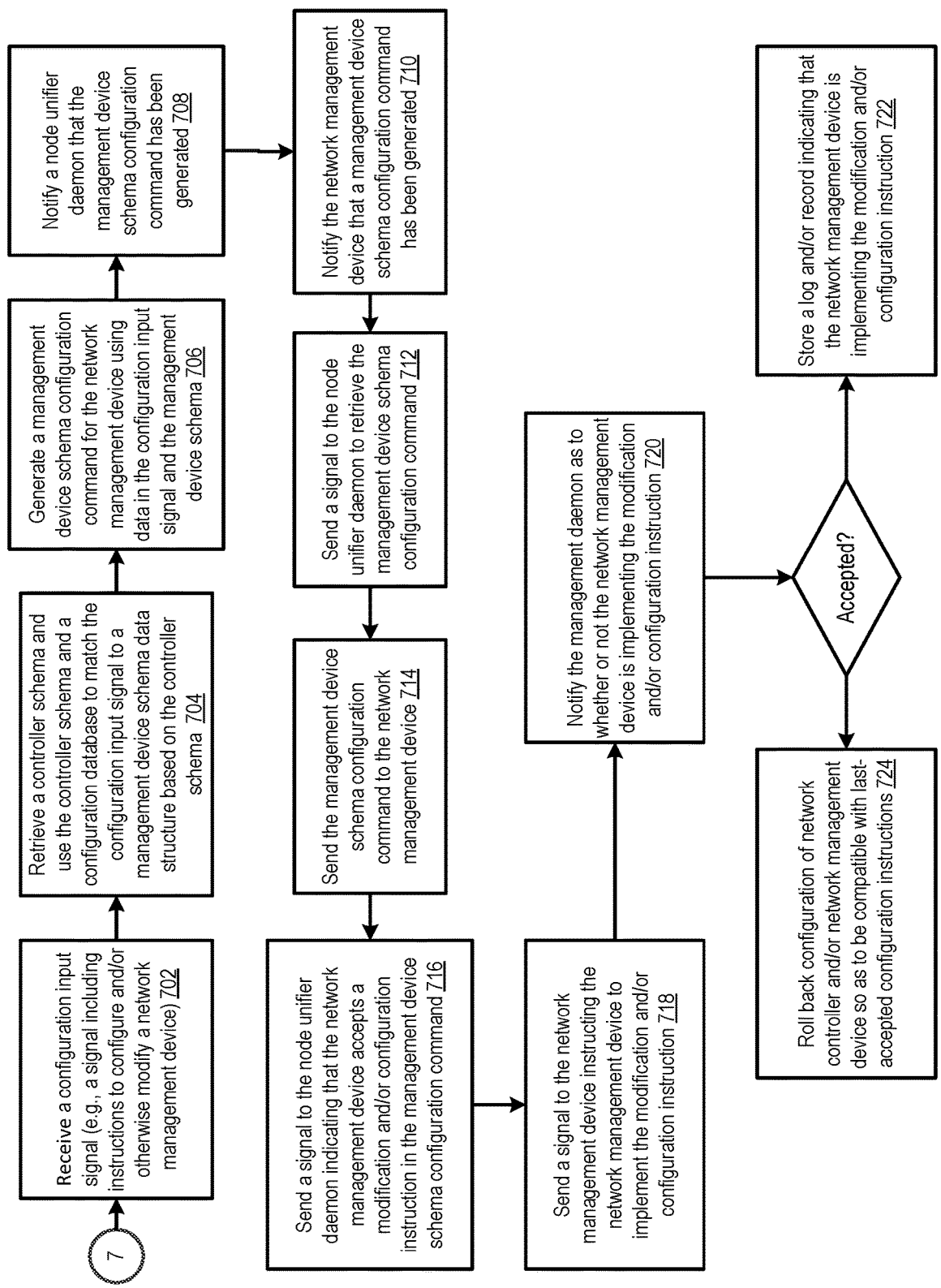
FIG. 7 is logic flow diagram illustrating translating network administrator input into configuration commands, according to the embodiment depicted in FIG. 6.

Continuing from FIG. 6, FIG. 7 illustrates translating configuration input signals into management device schema commands. For example, in some implementations, a network controller 102 can, at 702 and via a management daemon 206 (and/or a similar daemon, a processor, and/or a similar network device), receive a configuration input signal 402 that can include instructions to modify a network management device 104. The configuration input signal 402 can be generated and sent by a network administrator 106. The management daemon 206 can, at 704, retrieve a controller schema data structure (e.g., from the at least one memory of the network controller 102), and/or a management device schema 218*a* from the at least one configuration database 218 of the network controller 102, and can identify a management device schema data structure 218*a*, to use to generate a configuration command, based on an association between an identifier of a network management device 104 and/or a network management device model type in the configuration input signal 402, and the management device schema 218*a* that is stored in the at least one configuration database 218. Said another way, the network controller 102 can receive configuration input including a command to configure and/or modify a network management device 104. The network controller 102 can use the controller schema 214 to interpret the command, and to determine a network management device 104 for which to generate configuration commands. The network controller 102 can then use the at least one configuration database 218 to retrieve a management device schema 218*a* associated with that network management device 104, based on an association between the network management device 104 and the management device schema 218*a*, that is stored in the at least one configuration database 218.

The management daemon 206 can, at 706, generate a management device schema configuration command, e.g., based on the identified management device schema 218*a*, and based on data (e.g., instructions and/or other information) in the configuration input signal 402. Specifically, in some implementations, the management daemon 206 can generate the management device schema configuration command by extracting instructions in the configuration input signal 402, and by defining a management device schema configuration command that includes the instructions in the configuration input signal 402. The management daemon 206 can, at 708, notify a node unifier daemon 208 of the network controller 102 (and/or a similar daemon, a processor, and/or a similar network device separate from the network controller 102) that a management device schema configuration command has been generated. The node unifier daemon 208 can store the management device schema configuration command and can, at 710, notify the network management device 104 associated with the configuration command that a management device schema configuration command has been generated.

The network management device 104 can, at 712, send a signal to the node unifier daemon 208 to retrieve the management device schema configuration command e.g., via a management device modification fetch signal 504. The network controller 102, e.g., via the node unifier daemon 208 can, at 714, send the management device schema command to the network management device from the node unifier daemon 208, e.g., via a management device modification signal 506. The network management device 104 can also, at 716, send a signal to the node unifier daemon 208 indicating that the network management device 104 accepts a modification and/or configuration instruction included in the sent management device schema configuration command.

The node unifier daemon 208 can, in response to the signal and at 718, send a signal to the network management device 104 that instructs the network management device 104 to initiate the modification and/or configuration instruction. The node unifier daemon 208 can also notify, at 720, the management daemon 206 as to whether the network management device 104 accepted the modification and/or configuration instruction. If the modification and/or configuration instruction was accepted, then the node unifier daemon 208 can also, at 722, store a log and/or record indicating that the network management device 104 is implementing the modification and/or configuration instruction. For example, the node unifier daemon 208 can store information specifying the type of modifications and/or configuration changes being made to the network management device 104, based on the instructions included in the configuration input signal 402. If the modification and/or configuration instruction was rejected by network management device 104, the network controller 102 can, at 724, maintain the last-accepted configuration of the network management device 104. For example, the node unifier daemon 208 may not update a log and/or record indicating that the network management device 104 is implementing the modification and/or configuration instruction. The management daemon 206 can also modify a configuration of the network controller 102 so as to ensure that the configuration of the network controller 102 is compatible with the last-accepted configuration of the network management device 104).

Figure 8:
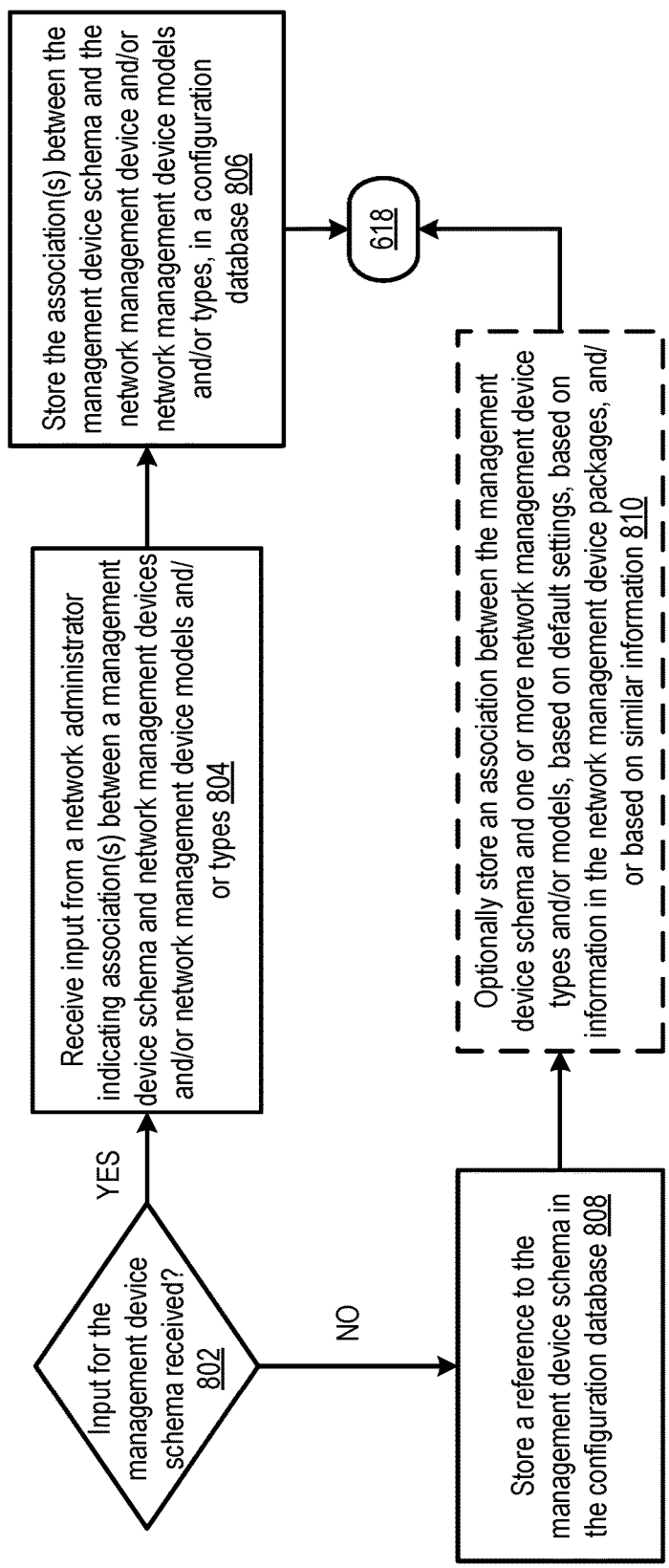
FIG. 8 is logic flow diagram illustrating associating configuration commands with network management devices, according to an embodiment.

FIG. 8 is logic flow diagram illustrating associating network management devices with configuration commands, according to an embodiment. For example, in some implementations, to associate management device schema configuration commands with a management device schema, a network controller 102 can, at 802, receive input for a management device schema (e.g., from a network administrator 106). For example, at 804, the input can indicate associations between one or more management device schemas 306A-E and one or more network management devices 104A-E and/or network management device model type(s) (e.g., MX240, EX4200, and/or similar device models). The network controller 102 can, at 806, store the association between the management device schema the network management device 104A-E and/or network management device model type, in at least one configuration database 218.

The network controller 102 can also, at 808, store a reference to the management device schema in the at least one configuration database 218, if no input indicating an association between the management device schema and a network management device has been received. The network controller 102 can, at 810, optionally store an association between the management device schema and one or more network management device types and/or models (e.g., based on default settings, based on information in the network management device package associated with the management device schema, and/or based on similar information).

Figure 9:
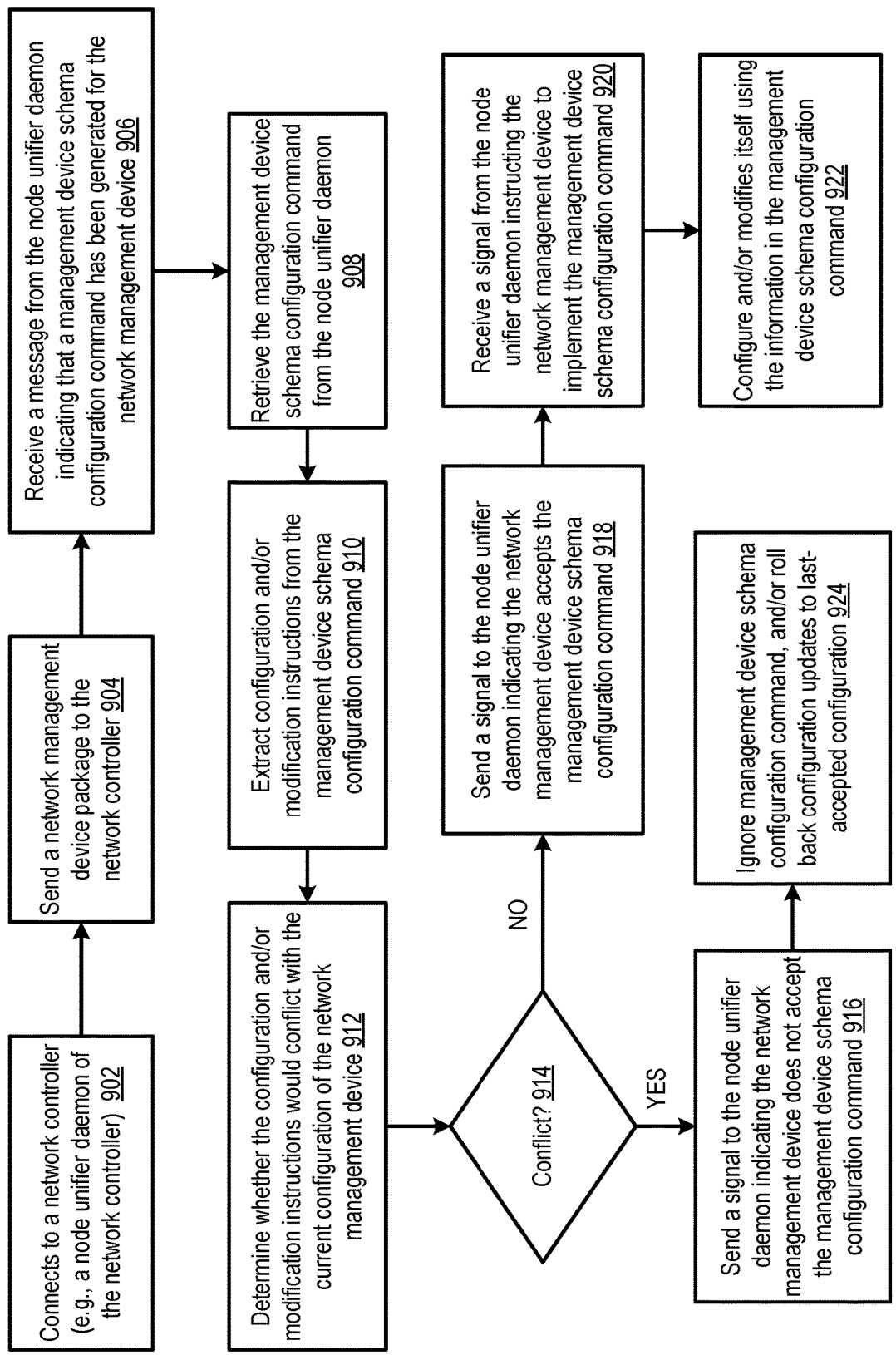
FIG. 9 is logic flow diagram illustrating configuring a network management device, according to an embodiment.

FIG. 9 is logic flow diagram illustrating configuring a network management device, according to an embodiment. For example, in some implementations, a network management device 104 can, at 902, connect to a network controller 102 (specifically, to a node unifier daemon 208 of the network controller 102). The network management device 104 can, at 904, send a network management device package 306 to the network controller 102. The network management device 104 can, at 906, receive a message from the network controller 102 (i.e., from the node unifier daemon 208 of the network controller 102) that indicates that a management device schema configuration command has been generated for the network management device 104. The network management device 104 can, at 908, retrieve the stored management device schema configuration command from the node unifier daemon 208. Specifically, the node unifier daemon 208 can send a management device schema configuration signal 404 to the network management device 104, including the management device schema configuration command.

The network management device 104 can, at 910, extract configuration and/or modification instructions from the management device schema configuration signal 404, and can, at 912, determine whether the configuration and/or modification instructions would conflict with the current configuration of the network management device 104, and/or determine whether the network management device is otherwise incapable of implementing instructions within the management device schema configuration signal. If, at 914, there is a conflict between the network management device's 104 current instructions and the management device schema configuration command in the management device schema configuration signal, the network management device 104 can, at 916, send a signal to the network controller 102 (i.e., to the node unifier daemon 208) indicating that the network management device 104 does not accept the management device schema configuration command. The node unifier daemon 208 can then inform a network administrator 106 that the network management device 104 cannot implement the management device schema configuration command. The network management device 104 can also, at 918, either ignore the management device schema configuration command or, if the network management device 104 attempted to implement the management device schema configuration command and was unable to do so, can roll back configuration settings at the network management device 104, e.g., to a previously-accepted configuration.

If the management device schema configuration command does not conflict with the network management device's 104 current settings, the network management device 104 can, at 918, send a first signal to the node unifier daemon 208 indicating that the network management device 104 has accepted the management device schema configuration command. The network management device 104 can, at 920, receive a second signal (e.g., from the node unifier daemon 208) that instructs the network management device 104 to implement and/or execute the management device schema configuration command. The network management device 104 can then, at 922, configure and/or modify itself using the information (e.g., instructions) in the management device schema configuration command.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Clojure©, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A processor-readable non-transitory medium storing code representing instructions to be executed by a processor, the code comprising code to cause the processor to:
receive a configuration input signal that includes instructions to configure a network management device;
determine a management device schema associated with the network management device based on a controller schema and a configuration database;
convert the configuration input signal into a management device schema configuration signal based on the management device schema; and
send the management device schema configuration signal so as to cause a modification of a configuration of the network management device, based on the management device schema configuration signal.

2. The processor-readable non-transitory medium of claim 1, wherein the code comprises code to cause the processor to:
receive a network management device package associated with the network management device,
generate at least one management device schema based on the network management device package, and
modify the configuration database based on the at least one management device schema.

3. The processor-readable non-transitory medium of claim 1, wherein the network management device is a first network management device and the management device schema is a first management device schema, and the code comprises code to cause the processor to:
receive a first network management device package associated with the first network management device,
generate the first management device schema based on the first network management device package,
modify the configuration database based on the first management device schema,
receive a second network management device package associated with a second network management device,
associate a second management device schema with the second network management device, and
modify a record in the configuration database based on the association.

4. The processor-readable non-transitory medium of claim 1, wherein the code comprises code to cause the processor to:
receive a network management device package associated with the network management device, the network management device package including a model and version identifier indicating a type of the network management device;
generate at least one management device schema based on the network management device package; and
store a data file representing the at least one management device schema in the configuration database.

5. The processor-readable non-transitory medium of claim 1, wherein the configuration database includes associations between the management device schema and a plurality of network management devices, and the code comprises code to cause the processor to:
determine the management device schema associated with the network management device based on the associations between the management device schema and the plurality of network management devices.

6. The processor-readable non-transitory medium of claim 1, wherein the code comprises code to cause the processor to:
receive, from a network administrator, input that includes a mapping of the management device schema to the network management device.

7. The processor-readable non-transitory medium of claim 1, wherein the code comprises code to cause the processor to:
implement a node unifier daemon to send a signal to the network management device so as to notify the network management device that the management device schema configuration signal has been generated for the network management device.

8. The processor-readable non-transitory medium of claim 1, wherein the code comprises code to cause the processor to:
implement a management daemon to determine when the management device schema configuration signal has been generated for the network management device, and
implement a node unifier daemon to send a signal to the network management device so as to notify the network management device that the management device schema configuration signal has been generated for the network management device.

9. The processor-readable non-transitory medium of claim 1, wherein the management device schema includes at least one data field name for a management device schema configuration command that includes instructions to configure the network management device.

10. An apparatus, comprising:
a memory; and
a processor operatively coupled to the memory, the processor configured to:
receive a network management device package associated with a network management device in a plurality of network management devices, the network management device package including a model and version identifier indicating a type of the network management device,
generate at least one management device schema based on the network management device package,
store a data file representing the at least one management device schema in a configuration database,
receive a configuration input signal that includes instructions to configure a network management device,
determine a management device schema associated with the network management device based on a controller schema and the configuration database,
convert the configuration input signal into a management device schema configuration signal based on the management device schema, and
send the management device schema configuration signal so as to cause a modification of a configuration of the network management device, based on the management device schema configuration signal.

11. The apparatus of claim 10, wherein the processor is configured to:
implement a management daemon to determine when the management device schema configuration signal has been generated for the network management device, and
implement a node unifier daemon to send a signal to the network management device so as to notify the network management device that the management device schema configuration signal has been generated for the network management device.

12. The apparatus of claim 10, wherein the processor is configured to receive, from a network administrator, input that includes a mapping of the management device schema to the network management device.

13. A method, comprising:
receiving, via a user interface, configuration input that includes instructions to configure a network management device from the plurality of network management devices;
retrieving a management device schema, for a configuration database, based on a controller schema and the configuration input;
generating a management device schema configuration command based on the configuration input and the management device schema;
sending a signal including a representation of the management device schema configuration command;
receiving a confirmation from the network management device that the network management device has accepted a configuration modification defined in the management device schema configuration command; and
instructing the network management device to enact the configuration modification.

14. The method of claim 13, further comprising:
receiving a network management device package;
modifying the controller schema based on an association between the network management device package and the network management device from the plurality of network management devices; and
generating the management device schema based on the network management device package.

15. The method of claim 13, further comprising:
receiving a network management device package that includes a type-length-value (TLV) package configured to be loaded on a network controller;
modifying the controller schema based on an association between the network management device package and the network management device from the plurality of network management devices; and
generating the management device schema based on the network management device package.

16. The method of claim 13, wherein the network management device is a first network management device and the management device schema is a first management device schema, and the method further comprises:
receiving a first network management device package;
modifying the controller schema based on a first association between the first network management device package and the first network management device;
generating the first management device schema based on the network management device package;
receiving a second network management device package different from the first network management device package;
modifying the controller schema based on a second association between the second network management device package and a second network management device from the plurality of network management devices; and
generating a second network management device schema associated with the second network management device, based on the second network management device package.

17. The method of claim 13, further comprising:
receiving a network management device package associated with the network management device, the network management device package including a model and version identifier indicating a type of the network management device;
generating at least one management device schema based on the network management device package; and
storing a data file representing the at least one management device schema in the configuration database.

18. The method of claim 13, wherein the management device schema includes at least one data field name for the management device schema configuration command, and the management device schema configuration command includes instructions to configure the network management device.

19. The method of claim 13, further comprising:
sending the signal including the representation of the management device schema configuration command to a node unification daemon so as to notify the network management device that the management device schema configuration command has been generated for the network management device.

20. The method of claim 13, further comprising:
storing an association between the management device schema and a network management device model is stored in the controller schema.

* * * * *